US006848083B2

(12) United States Patent
Shen (10) Patent No.: US 6,848,083 B2
(45) Date of Patent: Jan. 25, 2005

(54) DATA INPUT METHOD AND DEVICE FOR A COMPUTER SYSTEM

(76) Inventor: Hung-Lien Shen, Rua de Hac Sa Long Chao Kok No. 15, Macau (CN)

( * ) Notice: Subject to any disclaimer, the term of this patent is extended or adjusted under 35 U.S.C. 154(b) by 491 days.

(21) Appl. No.: 09/903,904

(22) Filed: Jul. 11, 2001

(65) Prior Publication Data

US 2003/0011562 A1 Jan. 16, 2003

(51) Int. Cl.[7] ................................................ G09G 5/00
(52) U.S. Cl. ....................... 715/863; 715/156; 715/700; 341/51; 341/55
(58) Field of Search ................................ 345/863, 156, 345/173, 162, 158, 700, 764, 765, 773, 866; 341/22, 26, 51, 54, 55, 144, 155, 142; 702/150, 151

(56) References Cited

U.S. PATENT DOCUMENTS

| | | | | |
|---|---|---|---|---|
| 5,111,826 A | * | 5/1992 | Nasiff | 600/485 |
| 5,581,484 A | * | 12/1996 | Prince | 702/150 |
| 6,380,923 B1 | * | 4/2002 | Fukumoto et al. | 345/156 |
| 2002/0012014 A1 | * | 1/2002 | Mohri | 345/863 |

OTHER PUBLICATIONS

IBM Technical Disclosure Bulletin, "Computer Input Device Nerve Signal Detection," Aug. 1, 1989, vol. No. 32, Issue No. 3A, p. No. 424–426.*

* cited by examiner

Primary Examiner—Raymond J. Bayerl
Assistant Examiner—Tadesse Hailu
(74) Attorney, Agent, or Firm—Mikio Ishimaru

(57) ABSTRACT

A data input method and device is provided that allows a user to input data to a computer by means of bending his/her five hand digits in a specified manner representing a keyboard character intended for input to the computer system. The bending of the user's five hand digits will then cause wrist muscle movements, which can be then sensed by a piezoelectric element in the data input device. In response, the piezoelectric element generates a corresponding electrical signal, which is then converted into binary form and transmitted via cable or wireless link to the computer system. Inside the computer system, the CPU searches through a predefined character-mapping table to find the character corresponding to the received signal from the data input device.

19 Claims, 10 Drawing Sheets

$0° < \angle Z < 20°$

FIG. 5(b)

$35° < \angle Z < 55°$

FIG. 5(c)

$70° < \angle Z < 90°$

| Pattern of hand digit movements | corresponding character |
|---|---|
| A(1)B(1)C(1)D(1)E(2) | Numerical symbol "1" |
| A(1)B(1)C(1)D(1)E(3) | Numerical symbol "2" |
| A(1)B(1)C(1)D(2)E(1) | Numerical symbol "3" |
| A(1)B(1)C(1)D(2)E(2) | Numerical symbol "4" |
| A(1)B(1)C(1)D(2)E(3) | Numerical symbol "5" |
| A(1)B(1)C(1)D(3)E(1) | Numerical symbol "6" |
| A(1)B(1)C(1)D(3)E(2) | Numerical symbol "7" |
| A(1)B(1)C(1)D(3)E(3) | Numerical symbol "8" |
| A(1)B(1)C(2)D(1)E(1) | Numerical symbol "9" |
| A(1)B(1)C(2)D(1)E(2) | Numerical symbol "0" |

FIG. 8

| Pattern of hand digit movements | Binary Code (8bit) |
|---|---|
| A(1)B(1)C(1)D(1)E(2) | 00000001 |
| A(1)B(1)C(1)D(1)E(3) | 00000010 |
| A(1)B(1)C(1)D(2)E(1) | 00000100 |
| A(1)B(1)C(1)D(2)E(2) | 00001000 |
| A(1)B(1)C(1)D(2)E(3) | 00010000 |
| A(1)B(1)C(1)D(3)E(1) | 00100000 |
| A(1)B(1)C(1)D(3)E(2) | 01000000 |
| A(1)B(1)C(1)D(3)E(3) | 10000000 |
| A(1)B(1)C(2)D(1)E(1) | 10000001 |
| A(1)B(1)C(2)D(1)E(2) | 10000010 |

FIG. 9

| Binary Code (8bit) | Corresponding character |
|---|---|
| 00000001 | Numerical symbol "1" |
| 00000010 | Numerical symbol "2" |
| 00000100 | Numerical symbol "3" |
| 00001000 | Numerical symbol "4" |
| 00010000 | Numerical symbol "5" |
| 00100000 | Numerical symbol "6" |
| 01000000 | Numerical symbol "7" |
| 10000000 | Numerical symbol "8" |
| 10000001 | Numerical symbol "9" |
| 10000010 | Numerical symbol "0" |

FIG. 10

DATA INPUT METHOD AND DEVICE FOR A COMPUTER SYSTEM

BACKGROUND OF THE INVENTION

1. Field of the Invention

This invention relates to computer peripheral technology, and more particularly, to a data input method and device for use with a computer system, which allows the user to input data, such as keyboard characters including alphabetic letters, numbers, special marks, and control codes, into the computer system.

2. Description of Related Art

Conventional data input methods for inputting data to a computer system are typically carried out through a keyboard having a plurality of keys, each key being used to input a certain character, such as an alphabetic letter, a number, a special mark, or a control code, into the computer system. When a key is being pressed down by user, it will activate the keyboard circuitry to generate a binary signal, called a scan code, and transfer it to the computer system. Inside the computer, the scan code is mapped to its corresponding keyboard character, which is then displayed on the monitor screen, completing the input of one keyboard character to the computer system. In addition, a pen-based input device also allows the user to input data to the computer system simply by writing the intended keyboard character on a drawing pad, which is typically used to input Chinese characters.

Still another type of data input method is to use a sensing device which is shaped like a glove into which the user's hand can be inserted, allowing the user to move his/her five hand digits in a specified manner to activate the sensing device to generate an electrical signal representing a keyboard character intended for input to the computer system. One drawback to this glove-like sensing device, however, is that it requires the layout of a plurality of small sensor units over the sensing device, which makes the internal circuitry of the sensing device quite complex and cost-ineffective to manufacture. Another drawback to this sensing device is that it is fixed in position on the desktop, i.e., immobile, so that it is inconvenient for use with a portable computer when the user is traveling.

Therefore, since all the above-mentioned conventional types of data input methods are inconvenient to use, there exists a need in the computer market for a new data input method and device that allows the user to input data to a computer system in an easier and more convenient way.

SUMMARY OF THE INVENTION

It is therefore an objective of this invention to provide a data input method and device, which allows the user to input data to a computer system in an easier and more convenient way without the use of keyboard or writing board.

It is another objective of this invention to provide a data input method and device, which allows the user to input data to a computer system through hand digit movements.

It is still another objective of this invention to provide a data input method and device, which, compared with the prior art, is less complex in circuit structure, so that it can be manufactured in a more cost-effective way.

In accordance with the foregoing and other objectives, the invention proposes a new data input method and device for inputting data to a computer system.

The data input method of the invention comprises the following steps: (1) predefining a set of combinations of hand digit movements, each combination of hand digit movements representing a specific character; (2) predefining a character mapping table which maps each combination of hand digit movements predefined in said step (i) to a specific character; (ii) sensing user's wrist muscle movements due to the user's hand digit movements representing a character intended for input to the computer system, and thereby producing a corresponding data signal; (iii) transmitting the data signal to the computer system; and (iv) searching through the character mapping table to find the character corresponding to the received data signal.

The foregoing data input method is implemented as a data input device which is coupled to the user's wrist. The data input device comprises a piezoelectric element, a signal conversion unit, and a signal processing unit. The piezoelectric element can sense the user's wrist muscle movements due to the user's hand digit movements representing a keyboard character intended for input to the computer system, and thereby generate a corresponding electrical signal. The signal conversion unit is used to convert the output signal from the piezoelectric element to binary form. The signal processing unit then modulates the output of the signal conversion unit into transmittable form for transmission to the computer system. Inside the computer system, the CPU searches through the character mapping table to find the keyboard character corresponding to the received signal from the data input device, and then displays the keyboard character on the monitor screen, completing the input of one keyboard character to the computer system.

The data input method and device of the invention has the following advantages over the prior art. First, the data input method and device of the invention can be used to replace conventional keyboards, writing pads, or glove-like sensing devices, for data input to a computer system, which is more convenient to use and more cost-effective to manufacture. Second, the data input method and device of the invention allows the user to input data to a computer system simply by bending his/her five hand digits to a specified manner representing the keyboard character intended for input to the computer system, which is easy and effortlessly to carry out. Third, the data input device of the invention is portable, and therefore allows the user to use it with a notebook computer on the road.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

Figure 1:
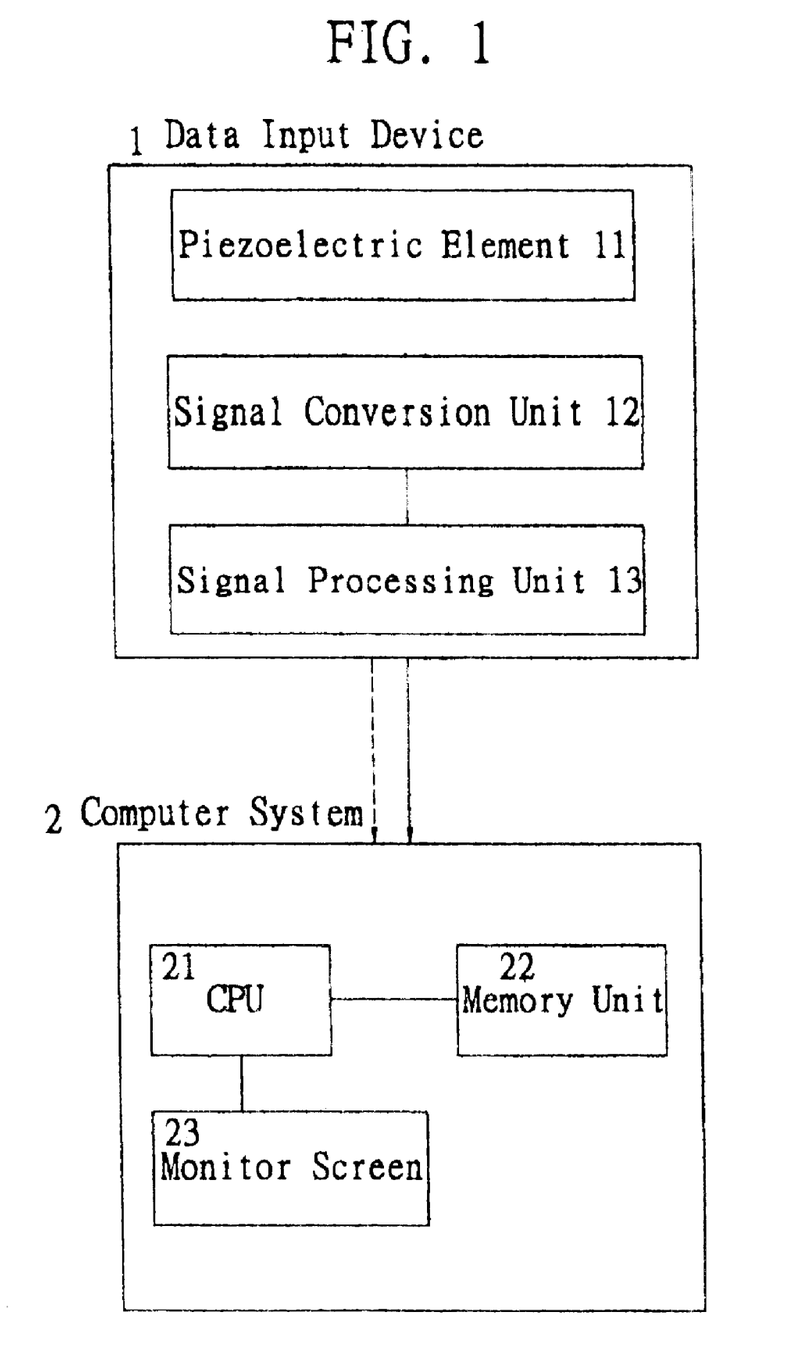
FIG. 1 is a schematic block diagram showing the basic hardware architecture of a computer system coupled to the data input device of the invention.

FIG. 1 is a schematic block diagram showing the basic hardware architecture of a computer system 2 coupled to the data input device of the invention 1. The coupling of the computer system 2 to the data input device of the invention 1 can be made either through cable link or wireless link. The data input device of the invention 1 includes a piezoelectric element 11, a signal conversion unit 12, and a signal processing unit 13. The computer system 2 includes a CPU 21, a memory unit 22, and a monitor screen 23.

In use, the data input device of the invention 1 is coupled to the user's wrist in such a manner as to allow the piezoelectric element 11 to come in direct contact with the skin of the wrist, so that the piezoelectric element 11 can sense the user's wrist muscle movements due to the bending of the user's hand digits in a specified manner (described later in this section), representing a keyboard character intended for input to the computer system 2, and thereby generating a corresponding piezoelectric signal. The output electrical signal from the piezoelectric element 11 is then transferred to the signal conversion unit 12 where it is converted into binary form. The binary output from the signal conversion unit 12 is then transferred to the signal processing unit 13, where it is modulated for transmission via the cable or wireless link to the computer system 2.

In the computer system 2, the memory unit 22 stores a character mapping table of the mapping of keyboard characters to various combinations of the user's hand digit movements. In response to the received signal from the signal processing unit 13, the CPU 21 will retrieve the corresponding character from the character mapping table in the memory unit 22 and then display the retrieved character on the monitor screen 23. This completes the input of one character from the data input device of the invention 1 to the computer system 2.

Figure 2:
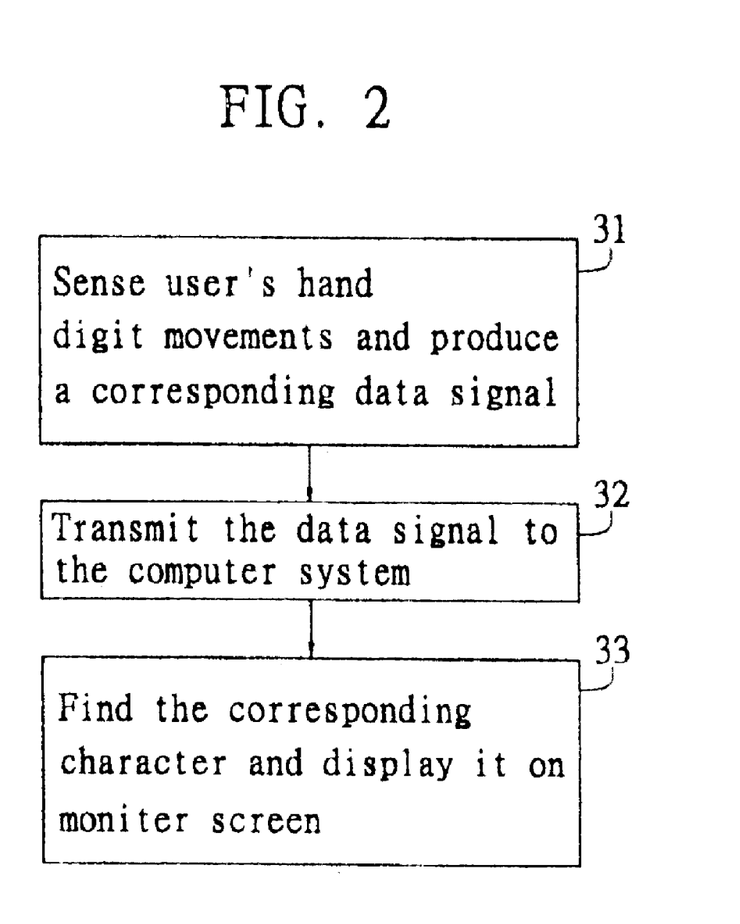
FIG. 2 is a flow diagram showing the procedural steps performed by the input device of FIG. 1 when the user is inputting keyboard characters to the computer system.

FIG. 2 is a flow diagram showing the procedural steps performed by the data input device of the invention 1 when the user is using the data input device of the invention 1 to input data to the computer system 2.

As shown, in step 31, the data input device of the invention 1 senses the user's wrist muscle movements due to the user's hand digit movements representing the keyboard character intended for input to the computer system 2, and thereby produces a corresponding electrical signal. The procedure then goes to step 32.

In step 32, the data input device of the invention 1 transfers the input signal to the computer system 2. The procedure then goes to step 33.

In step 33, the computer system 2 searches through a predefined character mapping table of the mapping of keyboard characters to various combinations of hand digit movements, and then retrieves the corresponding keyboard character from this character mapping table. This completes the input of one character from the data input device of the invention 1 to the computer system 2.

Figure 3:
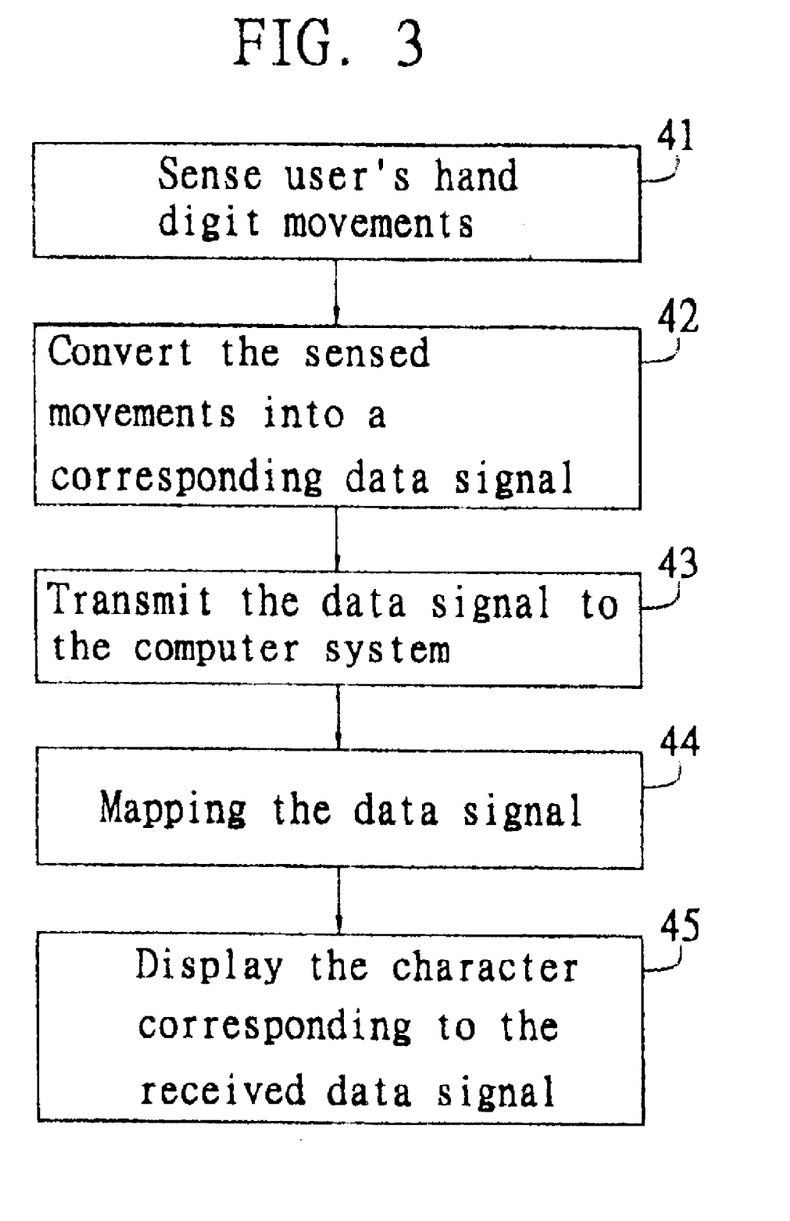
FIG. 3 is a flow diagram showing more detailed procedural steps of the flow diagram of FIG. 2.

FIG. 3 is a flow diagram showing more detailed procedural steps of the flow diagram of FIG. 2. The data input device of the invention 1 is capable of sensing the user's wrist muscle movements due to the user's hand digit movements representing the keyboard character intended for input to the computer system, and thereby produces a corresponding electrical signal. The keyboard character can be an alphabetic letter, a number, or a special character. When using the device, the user should wear the data input device of the invention 1 on his/her wrist, allowing the user's wrist muscle movements, due to the user's hand digit movements, to be sensed by the data input device of the invention 1.

As shown, in step 41, the data input device of the invention 1 senses the user's wrist muscle movements due to the user's hand digit movements representing the keyboard character intended for input to the computer system. The procedure then goes to step 42.

In step 42, the data input device of the invention 1 produces a corresponding electrical signal in response to the sensed wrist muscle movements on the user's wrist due to the user's hand digit movements representing the keyboard character intended for input to the computer system. The procedure then goes to step 43.

In step 43, the data input device of the invention 1 transfers its output signal to the computer system 2. The procedure then goes to step 44.

In step 44, in response to the received input signal from the data input device of the invention 1, the computer system 2 searches through a predefined character mapping table of the mapping of keyboard characters for various combinations of hand digit movements, and then retrieves the corresponding keyboard character from this character mapping table. The procedure then goes to step 45.

In step 45, the computer system 2 displays the retrieved keyboard character on the monitor screen 23. This completes the input of one keyboard character to the computer system 2.

Figure 4:
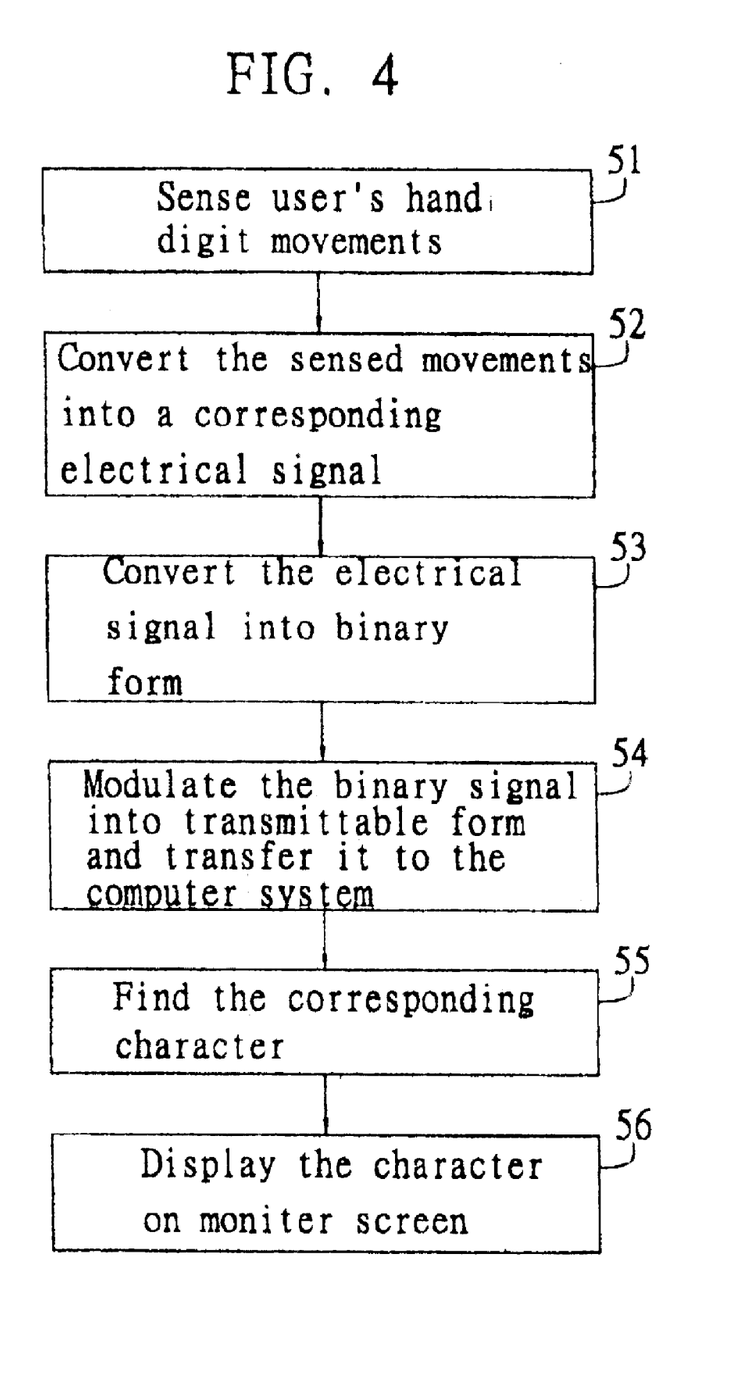
FIG. 4 is a flow diagram showing more detailed procedural steps of the flow diagram of FIG. 3.

FIG. 4 is a flow diagram showing more detailed procedural steps of the flow diagram of FIG. 3. As mentioned earlier, the data input device of the invention 1 includes a piezoelectric element 11, a signal conversion unit 12, and a signal processing unit 13. The piezoelectric element 11 is capable of sensing the user's wrist muscle movements due to the user's hand digit movements representing the keyboard character intended for input to the computer system, and thereby producing a corresponding electrical signal come in representing the intended keyboard character. While using the device, the user should make his/her wrist contact with the piezoelectric element 11.

In step 51, the piezoelectric element 11 senses the user's wrist muscle movements due to the user's hand digit movements representing the keyboard character intended for input to the computer system. The procedure then goes to the step 52.

In step 52, the piezoelectric element 11 produce a corresponding electrical signal in response to the sensed wrist muscle movements on the user's wrist, and then transfers the produced electrical signal to the signal conversion unit 12. The procedure then goes to step 53.

In step 53, the signal conversion unit 12 converts the received signal into digital form, and then transfers the digital output to the signal processing unit 13. The procedure then goes to step 54.

In step 54, the signal processing unit 13 modulates the output signal from the signal conversion unit 12 into transmittable form and then transmits the modulated signal via cable or wireless link to the computer system 2. The procedure then goes to step 55.

In step 55, in response to the received signal, the computer system 2 searches through a predefined character mapping table to find the corresponding keyboard character. The procedure then goes to step 56.

In step 56, the computer system 2 displays the retrieved keyboard character on the monitor screen 23. This completes the input of one keyboard character to the computer system 2.

Figure 5A:
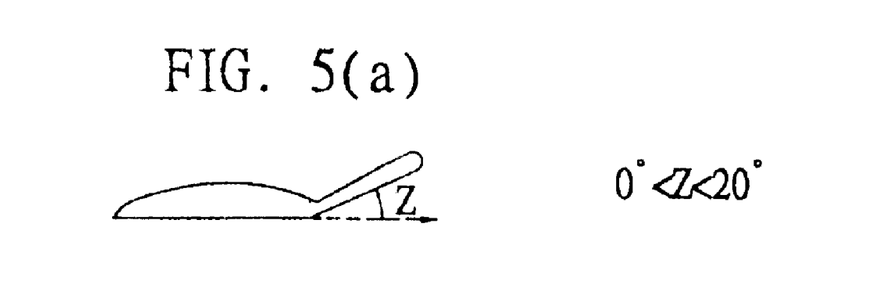
FIGS. 5A–5C are schematic diagrams used to depict the meanings of various hand digit movements in accordance with the invention.
Figure 5B:
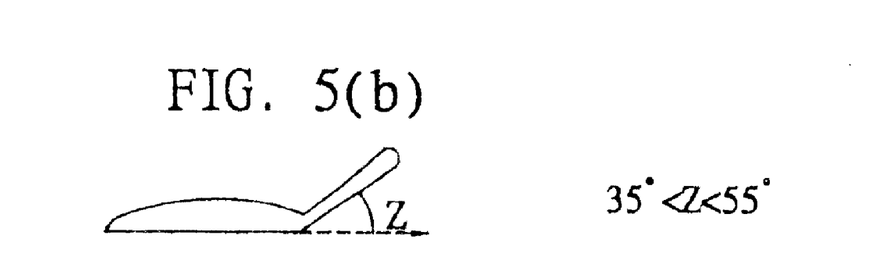
Figure 5C:
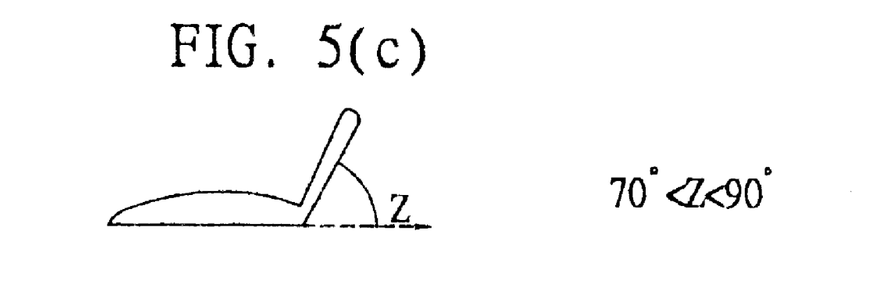

FIGS. 5A–5C are schematic diagrams used to depict the meanings of various hand digit movements in accordance with the invention. In accordance with the invention, each of the five digits of a human's hand can be bent into three ranges of angles, including a first range of from 0° to 20° (0°<Z<20°) shown in FIG. 5A; a second range of from 35° to 55° (35<Z<55°) shown in FIG. 5B; and a third range of from 70° to 90° (70°<Z<90°) shown in FIG. 5C (in FIGS. 5A–5C, Z represents the angle between each digit and the desk-top).

The undefined angle ranges from 21° to 34° and from 56° to 69° are nonfunctional ranges in which no actions will be activated by the bending of the hand digits. In this way, the invention defines each digit to represent three levels of data; and therefore, a total of $3^5=243$ levels of data can be represented by bending the five digits of one hand. A typical computer keyboard includes a total of only about 100 keys, or slightly more or less; and therefore, all the keyboard characters on a computer keyboard can be triggered by the combinations of hand digit movements in accordance with the invention.

Figure 6:
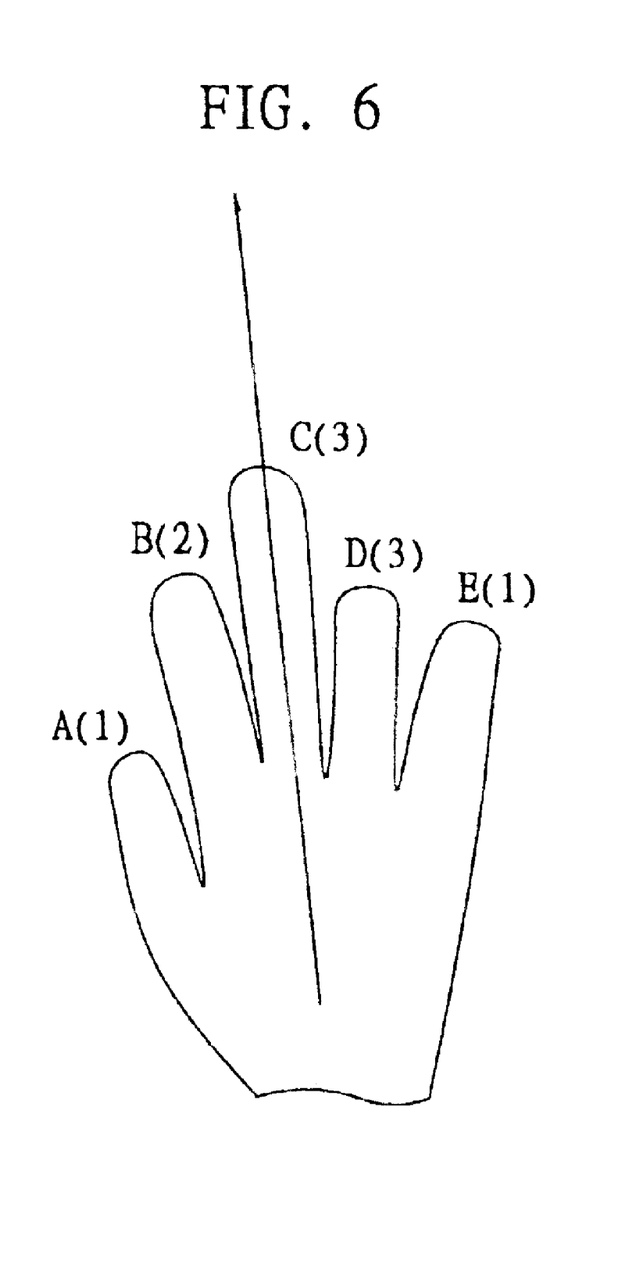
FIG. 6 is a schematic diagram depicting an example of a combination of hand digit movements by the user to represent a certain keyboard character.

FIG. 6 is a schematic diagram depicting an example of a combination of hand digit movements by the user to represent a certain keyboard character. Assume A(n), n=1, 2, or 3, represents the range of angles the thumb is currently being bent at; B(n), n=1, 2, or 3, represents the range of angles the index finger is currently being bent at; C(n), n=1, 2, or 3, represents the range of angles the middle finger is currently being bent at; D(n), n=1, 2, or 3, represents the range of angles the ring finger is currently being bent at; and E(n), n=1, 2, or 3, represents the range of angles the little finger is currently being bent at.

Accordingly, when the user bends his/her thumb, index finger, middle finger, ring finger, and littlefinger respectively into the angles of 10°, 45°, 80°, 85°, and 15°, it represents [A(1), B(2), C(3), D(3), E(1)]. By predefined character mapping table, this combination of hand digit movements is mapped to a certain keyboard character. Therefore, each keyboard character on the computer keyboard can be input by the user to the computer system simply by bending his/her five hand digits into the corresponding combination of angles.

Figure 7:
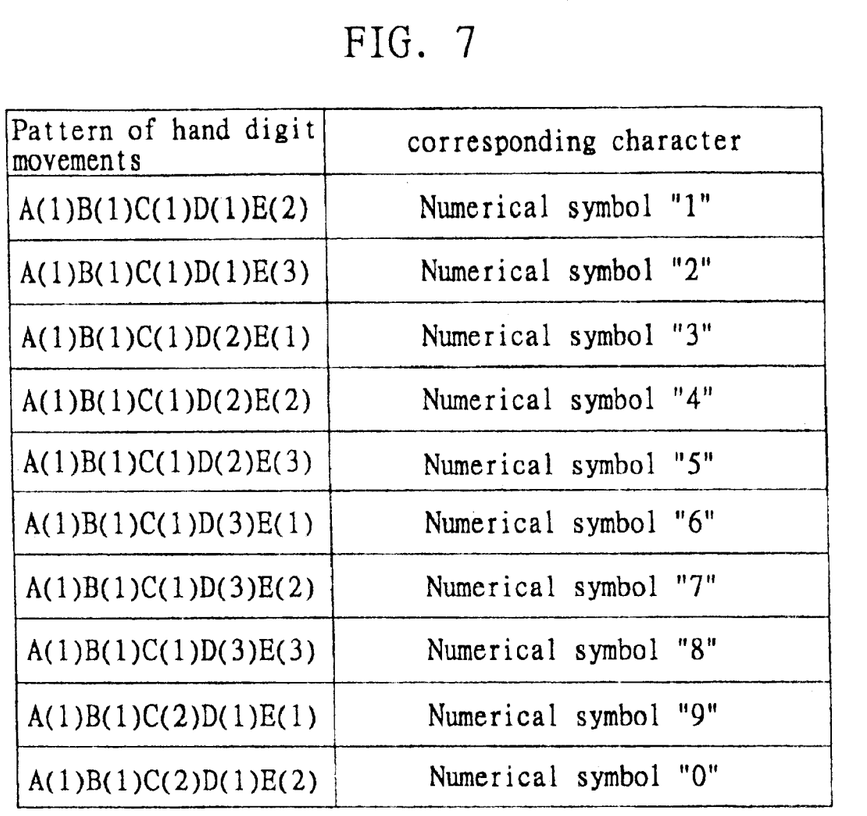
FIG. 7 is a table showing an example of the mapping of various combinations of hand digit movements to keyboard characters.

FIG. 7 is a table showing an example of the mapping of various combinations of hand digit movements to keyboard characters. As shown, the combination of hand digit movements [A(1), B(1), C(1), D(1), E(2)] is assigned to represent the numerical character "1"; [A(1), B(1), C(1), D(1), E(3)] is assigned to represent the numerical character "2"; [A(1), B(1), C(1), D(2), E(1)] is assigned to represent the numerical character "3"; [A(1), B(1), C(1), D(2), E(2)] is assigned to represent the numerical character "4"; [A(1), B(1), C(1), D(2), E(3)] is assigned to represent the numerical character "5"; [A(1), B(1), C(1), D(3), E(1)] is assigned to represent the numerical character "6"; [A(1), B(1), C(1), D(3), E(2)] is assigned to represent the numerical character "7"; [A(1), B(1), C(1), D(3), E(3)] is assigned to represent the numerical character "8"; [A(1), B(1), C(2), D(3), E(3)] is assigned to represent the numerical character "9"; and [A(1), B(1), C(2), D(1), E(2)] is assigned to represent the numerical character "0". Based on this character mapping table, when the user wants to input a certain numerical character, for example "5", he/she needs just to bend the five digits of the hand holding the data input device of the invention into a combination of hand digit movements representing [A(1), B(1), C(1), D(2), E(3)]; i.e., by bending the thumb into the (1)st range of angles; bending the index fingers into the (1)st range of angles; bending the middle finger into the (1)st range of angles; bending the ring finger into the (2)nd range of angles; and bending the little finger into the (3)rd range of angles. The data input device of the invention can sense these hand digit movements and thereby produce a corresponding electrical signal representing the intended numerical character "5".

Figure 8:
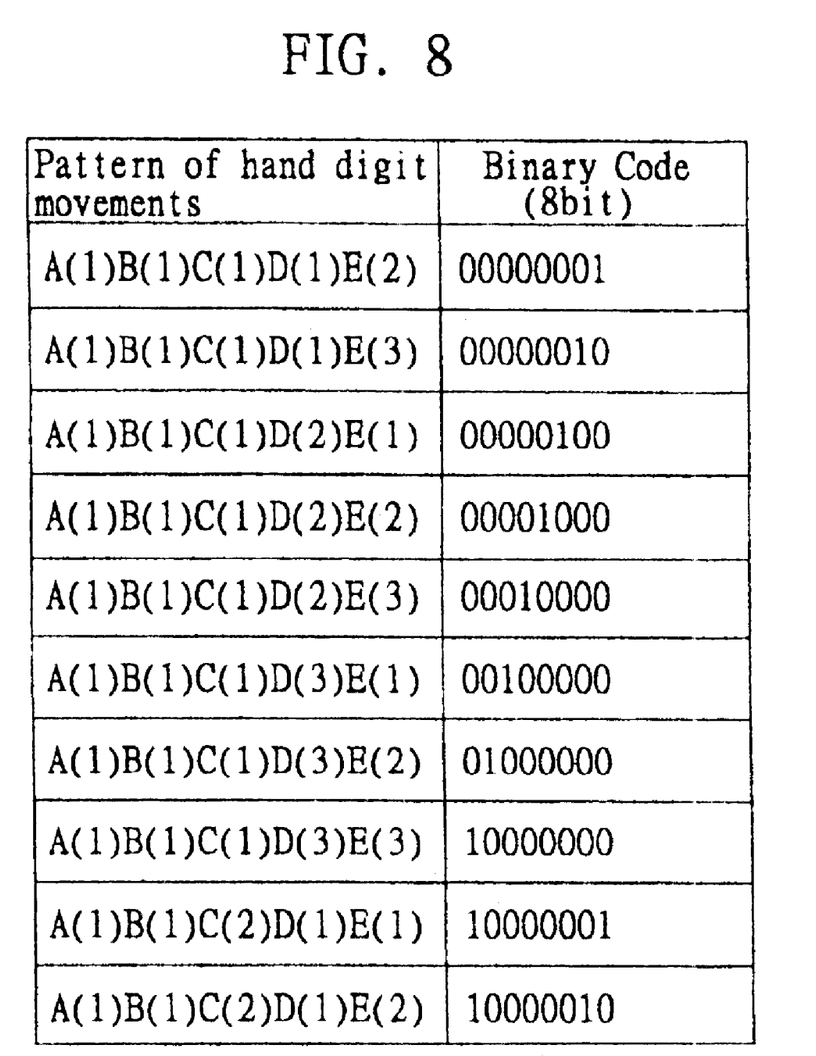
FIG. 8 is a table showing an example of the mapping of various combinations of hand digit movements to byte values.

FIG. 8 is a table showing an example of the mapping of various combinations of hand digit movements to byte values. As shown, the combination of hand digit movements [A(1), B(1), C(1), D(1), E(2)] is assigned to represent the byte value "00000001"; [A(1), B(1), C(1), D(1), E(3)] is assigned to represent the byte value "00000010"; [A(1), B(1), C(1), D(2), E(1)] is assigned to represent the byte value "00000100"; [A(1), B(1), C(1), D(2), E(2)] is assigned to represent the byte value "00001000"; [A(1), B(1), C(1), D(2), E(3) ] is assigned to represent the byte value "00010000"; [A(1), B(1), C(1), D(3), E(1)] is assigned to represent the byte value "00100000"; [A(1), B(1), C(1), D(3), E(2)] is assigned to represent the byte value "01000000"; [A(1), B(1), C(1), D(3), E(3)] is assigned to represent the byte value "10000000"; [A(1), B(1), C(2), D(1), E(1)] is assigned to represent the byte value "10000001"; and [A(1), B(1), C(2), D(1), E(2)] is assigned to represent the byte value "10000010". Based on the character mapping table of FIG. 8, for example, when the user bends his/her five hand digits to represent [A(1), B(1), C(1), D(1), E(2)], it will activate the data input device of the invention 1 to produce the binary signal "00000001" and transfer it to the computer system 2.

Figure 9:
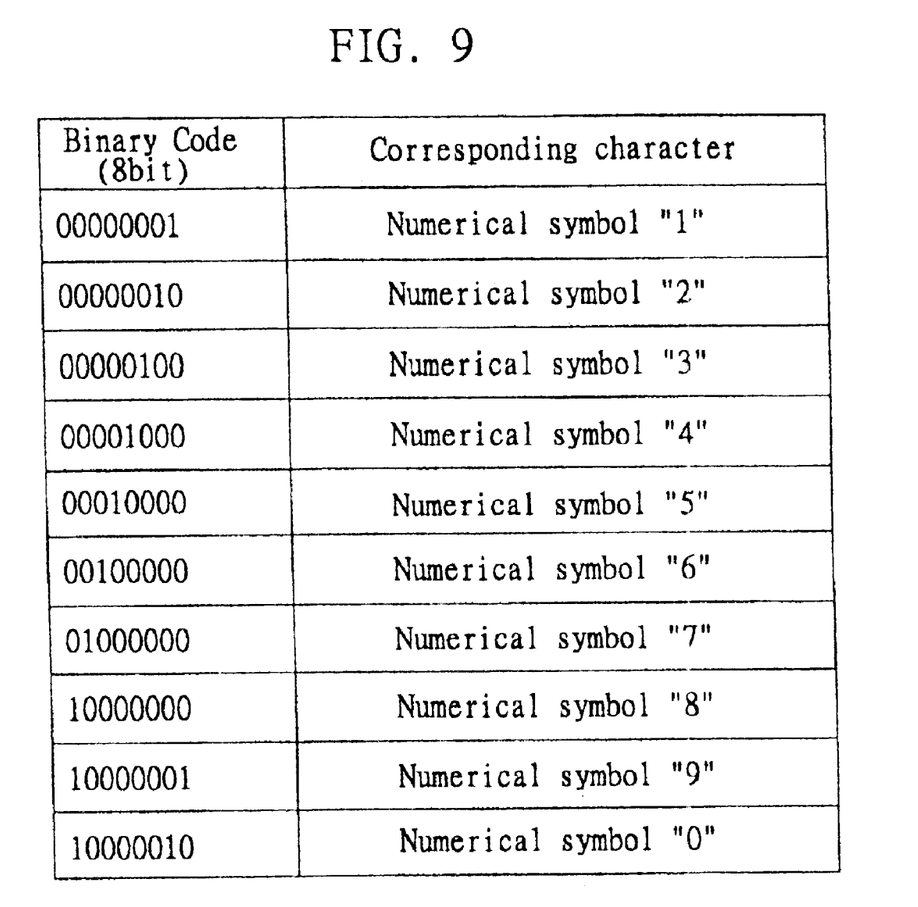
FIG. 9 is a table showing an example of the mapping of various binary signals to keyboard characters.

FIG. 9 is a table showing an example of the mapping of various binary signals to keyboard characters, which is stored in the memory unit 22 in the computer system 2. As shown, this character mapping table shows that when the binary signal "000000001" is received, it represents the input of the numerical character "1" from the data input device of the invention 1 to the computer system 2; when the binary signal "00000001" is received, it represents the input of the numerical character "1" from the data input device of the invention 1 to the computer system 2; when the binary signal "00000010" is received, it represents the input of the numerical character "2" from the data input device of the invention 1 to the computer system 2; when the binary signal "00000100" is received, it represents the input of the numerical character "3" from the data input device of the invention 1 to the computer system 2; when the binary signal "00001000" is received, it represents the input of the numerical character "4" from the data input device of the invention 1 to the computer system 2; when the binary signal "00010000" is received, it represents the input of the numerical character "5" from the data input device of the invention 1 to the computer system 2; when the binary signal "00100000" is received, it represents the input of the numerical character "6" from the data input device of the invention 1 to the computer system 2; when the binary signal "01000000" is received, it represents the input of the numerical character "7" from the data input device of the invention 1 to the computer system 2; when the binary signal "10000000" is received, it represents the input of the numerical character "8" from the data input device of the invention 1 to the computer system 2; when the binary signal "10000001" is received, it represents the input of the numerical character "9" from the data input device of the invention 1 to the computer system 2; and when the binary signal "10000010" is received, it represents the input of the numerical character "0" from the data input device of the invention 1 to the computer system 2. After the CPU 21 retrieves the corresponding keyboard character from the memory unit 22, it then displays the retrieved keyboard character on the monitor screen 23.

Figure 10:
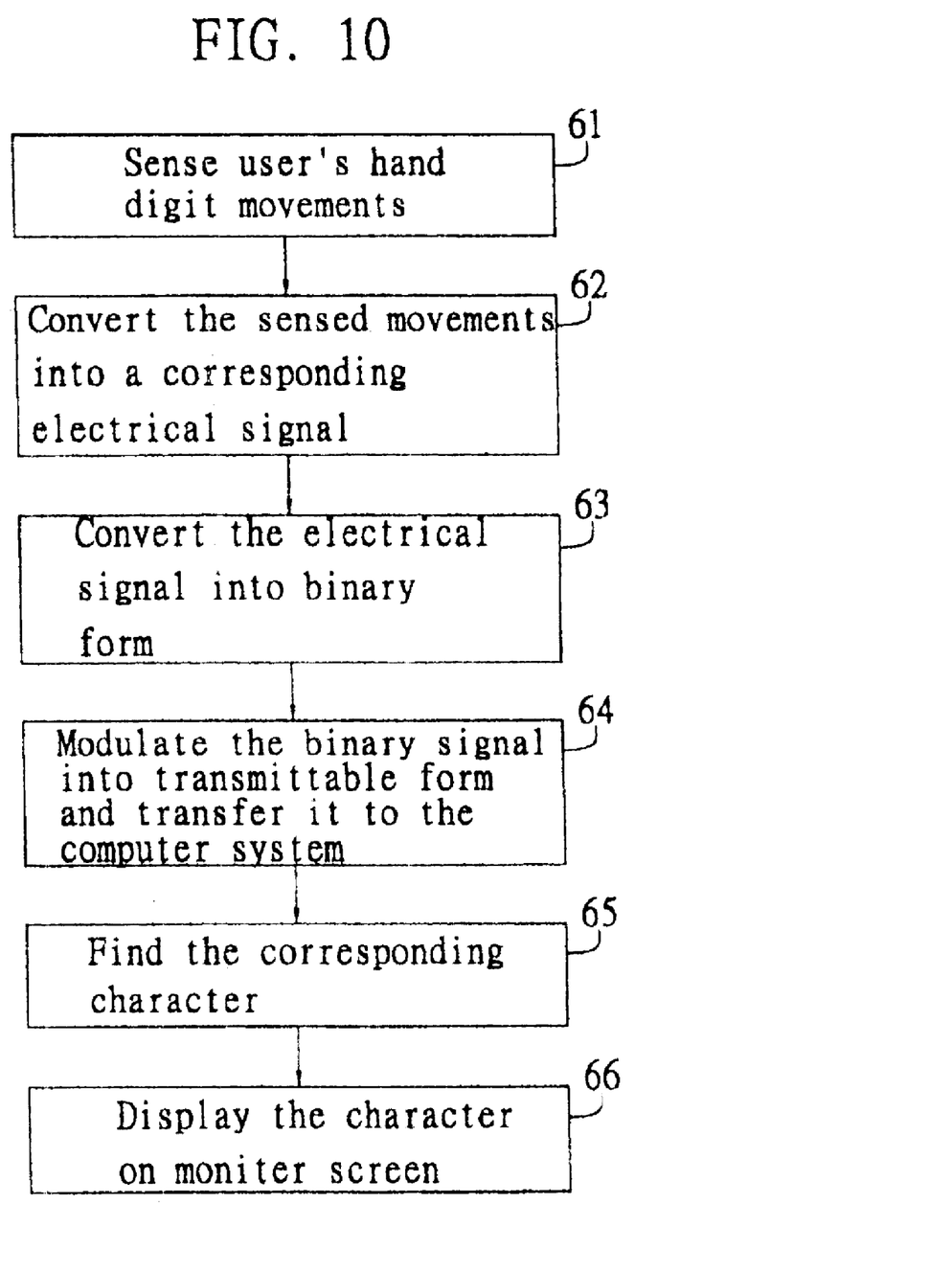
FIG. 10 is a flow diagram showing detailed procedural steps to input a keyboard character to the computer system through the data input method and device of the invention.

FIG. 10 is a flow diagram showing detailed procedural steps to input a keyboard character to the computer system through the data input method and device of the invention. In use, the data input device of the invention 1 is coupled to the user's wrist so that it can sense the wrist's muscle movements when the user bends his/her five hand digits. Assuming the user intends to input the numerical data "1" to the computer system 2, then the following procedural steps are performed:

In step 61, the data input device of the invention 1 is coupled to the user's hand in such a manner as to allow the piezoelectric element 11 to come in direct contact with the user's wrist. The procedure then goes to step 62.

In step 62, it can be learned from the character mapping table of FIG. 7 that the user should position the angle of his/her five hand digits in such a manner as to give [A(1), B(1), C(1), D(1), E(2)] for the purpose of inputting the numerical data "1". When doing this, the piezoelectric element 11 in the data input device of the invention 1 senses the user's wrist muscle movements caused by the bending of the user's five hand digits to represent [A(1), B(1), C(1), D(1), E(2)]. In response, the piezoelectric element 11 will produce a corresponding electrical signal and transfer it to the signal conversion unit 12. The procedure then goes to step 63.

In 63, the signal conversion unit 12 converts the received signal from the piezoelectric element 11 into the binary signal "00000001" corresponding to [A(1), B(1), C(1), D(1), E(2)] and then transfers the binary signal to the signal processing unit 13. The procedure then goes to step 64.

In step 64, the signal processing unit 13 modulates the output binary signal "100000001" from the signal conversion unit 12 into transmittable form and then transmits the modulated signal via cable or wireless link to the computer system 2. The procedure then goes to step 65.

In step 65, upon receiving [A(1), B(1), C(1), D(1), E(2)] from the data input device of the invention 1, the computer system 2 will search through the character mapping table shown in FIG. 9 (which is prestored in the memory unit 22) to find the keyboard character corresponding to "00000001" (in this case, the numerical character "1" is found and retrieved). The procedure then goes to step 66.

In step 66, the CPU 21 displays the numerical character "1" on the monitor screen 23. This completes the input of one keyboard character to the computer system 2.

In conclusion, the invention provides a new data input method and device, which allows the user to input data to a computer system by means of bending his/her five hand digits in a specified manner representing a keyboard character intended for input to the computer system. The bending of the user's five hand digits will then cause wrist muscle movements which can be then sensed by a piezoelectric element in the data input device of the invention. In response, the piezoelectric element generates a corresponding electrical signal which is then converted into binary form and transmitted via cable or wireless link to the computer system. Inside the computer system, the CPU searches through a predefined character mapping table to find the character corresponding to the received signal from the data input device, and then displays the retrieved character on the monitor screen, completing the input of one keyboard character to the computer system.

The data input method and device of the invention has the following advantages over the prior art.

First, the data input method and device of the invention can be used to replace conventional keyboards, writing pads, or glove-like sensing devices, for data input to a computer system, which is more convenient to use and more cost-effective to manufacture.

Second, the data input method and device of the invention allows the user to input data to a computer system simply by bending his/her five hand digits in a specified manner representing the keyboard character intended for input to the computer system, which is easy and effortlessly to carry out.

Third, the data input device of the invention is portable, and therefore allows the user to use it with a notebook computer when traveling.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A data input method for use with a computer system for user data input to the computer system, comprising the steps of:
   (1) predefining a set of combinations of hand digit movements, each combination of hand digit movements representing a specific character;
   (2) predefining a character mapping table which maps each combination of hand digit movements predefined in said step (1) to a specific character;
   (3) sensing user's wrist muscle movements due to the user's hand digit movements representing a character intended for input to the computer system, and thereby producing a corresponding data signal;
   (4) transmitting the data signal to the computer system; and
   (5) searching through the character mapping table to find the character corresponding to the received data signal.

2. The method of claim 1, wherein in said step (1), the user's wrist muscle movements are sensed by a data input device coupled to the user's wrist.

3. The method of claim 2, wherein the data input device comprises a piezoelectric element, a signal conversion unit, a signal processing unit.

4. The method of claim 3, wherein the piezoelectric element is attached to the user's wrist to sense the wrist's muscle movements due to the user's hand digit movements representing a keyboard character intended for input to the computer system to thereby produce a corresponding electrical signal.

5. The method of claim 3, wherein the signal conversion unit is coupled to the piezoelectric element to convert the output signal of the piezoelectric element into a data signal.

6. The method of claim 5, wherein the data signal is a digital signal.

7. The method of claim 5, wherein the data signal is an analog signal.

8. The method of claim 3, wherein the signal processing unit is coupled to the signal conversion unit and is capable of modulating the data signal into transmittable form for transmission to the computer system.

9. The method of claim 1, further comprising the step of:
displaying the data corresponding to the received data signal on a monitor screen.

10. A data input method for use to input data to a computer system, comprising the steps of:
(1) predefining a set of combinations of hand movements, each combination of hand digit movements representing a specific character;
(2) predefining a character mapping table which maps each combination of hand digit movements predefined m said step (1) to the specific character;
(3) coupling a sensing device to user's wrist, the sensing device capable of sensing wrist's muscle movements due to hand digit-bending movements within a certain range of angle for representing the specific character to thereby produce a corresponding electrical signal;
(4) converting the electrical signal into a corresponding data signal;
(5) transmitting the data signal to the computer system;
(6) activating the computer system to search through the character mapping table to find the character corresponding to the received data signal; and
(7) displaying the character corresponding to the data signal on a monitor screen.

11. The method of claim 10, wherein the sensing device comprises a piezoelectric element, a signal conversion unit, a signal processing unit.

12. The method of claim 11, wherein the piezoelectric element is attached to the user's wrist to sense the wrist's muscle movements due to the user's hand digit movements representing a keyboard character intended for input to the computer system to thereby produce a corresponding electrical signal.

13. The method of claim 11, wherein the signal conversion unit is coupled to the piezoelectric element to convert the output signal of the piezoelectric element into a data signal.

14. The method of claim 13, wherein the data signal is a digital signal.

15. The method of claim 13, wherein the data signal is an analog signal.

16. The method of claim 11, wherein the signal processing unit is coupled to the signal conversion unit and is capable of modulating the data signal into transmittable form for transmission to the computer system.

17. A data input method for use with a sensing device including a piezoelectric element, a memory unit, a signal conversion unit, and a signal processing unit, to input data to a computer system, comprising the steps of:
(1) predefining a set of combinations of hand movements, each combination of hand digit movements representing a specific character;
(2) predefining a character mapping table which maps each combination of hand digit movements predefined m said step (1) to the specific character and storing the character mapping table in the memory unit;
(3) coupling the sensing device to user's wrist, the sensing device capable of sensing wrist's muscle movements to thereby produce a corresponding electrical signal;
(4) activating the piezoelectric element to sense the user's wrist muscle movements due to the user's hand digit-bending movements within a certain range of angle for representing a keyboard character intended for input to the computer system, whereby the piezoelectric element produces a corresponding electrical signal;
(5) activating the signal conversion unit to convert the electrical signal into a data signal;
(6) activating the signal processing unit to modulate the data signal for transmission to the computer system;
(7) activating the computer system to search through a character mapping table to find the keyboard character corresponding to the received data signal; and
(8) displaying the keyboard character corresponding to the data signal on a monitor screen.

18. A data input device for use to input data to a computer system, the data input device comprising:
a piezoelectric element coupled to user's wrist and capable of sensing a combination of predefined hand digit movements which are mapped to a computer code by a mapping table to thereby produce a corresponding electrical signal representing the computer code intended for input to the computer system;
a signal conversion unit coupled to the piezoelectric element and capable of converting the electrical signal from the piezoelectric element into a data signal; and
a signal processing unit coupled to the signal conversion unit and capable of modulating the data signal for transmission to the computer system, whereby the computer code corresponding to the data signal is obtained.

19. A data input device for use to input data to a computer system, the data input device comprising:
a piezoelectric element coupled to user's wrist and capable of sensing wrist's muscle movements to a combination of hand digit-bending movements within a certain range of angle to thereby produce a corresponding electrical signal representing the computer code intended for input to the computer system, wherein the combination of hand digit-bending movements are predefined and mapped to a computer code by a mapping table;
a signal conversion unit coupled to the piezoelectric element and capable of converting the electrical signal from the piezoelectric element into a data signal;
a signal processing unit coupled to the signal conversion unit and capable of modulating the data signal for transmission to the computer system; and
mapping means provided in the computer system, which is capable of finding the computer code corresponding to the received data signal from the signal processing unit according to the mapping table.

\* \* \* \* \*